(12) United States Patent
Madden

(10) Patent No.: US 10,825,319 B1
(45) Date of Patent: Nov. 3, 2020

(54) UNDERWATER VIDEO MONITORING FOR SWIMMING POOL

(71) Applicant: ObjectVideo Labs, LLC, Tysons, VA (US)

(72) Inventor: Donald Madden, Columbia, MD (US)

(73) Assignee: ObjectVideo Labs, LLC, Tysons, VA (US)

( * ) Notice: Subject to any disclaimer, the term of this patent is extended or adjusted under 35 U.S.C. 154(b) by 0 days.

(21) Appl. No.: 16/121,753

(22) Filed: Sep. 5, 2018

Related U.S. Application Data

(60) Provisional application No. 62/554,226, filed on Sep. 5, 2017.

(51) Int. Cl.
| | | |
|---|---|---|
| *G08B 21/08* | (2006.01) | |
| *H04N 7/18* | (2006.01) | |
| *G06K 9/00* | (2006.01) | |
| *E04H 4/14* | (2006.01) | |
| *H04N 5/235* | (2006.01) | |
| *G08B 13/196* | (2006.01) | |
| *G08B 21/22* | (2006.01) | |
| *G06T 7/00* | (2017.01) | |

(52) U.S. Cl.
CPC ............. *G08B 21/08* (2013.01); *E04H 4/148* (2013.01); *G06K 9/00362* (2013.01); *G06T 7/0002* (2013.01); *G08B 13/19656* (2013.01); *G08B 21/22* (2013.01); *H04N 5/2351* (2013.01); *H04N 7/185* (2013.01)

(58) Field of Classification Search
CPC .... G08B 21/00; G08B 21/02; G08B 21/0476; G08B 21/08; G08B 21/084; G08B 21/086; G08B 21/22; G08B 23/00; G08B 13/19656; G06K 9/00362; G06K 9/00771; G06T 7/00; G06T 7/0002; G06T 7/0008; E04H 4/148; H04N 7/185; H04N 5/2351
See application file for complete search history.

(56) References Cited

U.S. PATENT DOCUMENTS

| | | | |
|---|---|---|---|
| 6,133,838 A | 10/2000 | Meniere | |
| 9,049,352 B2 | 6/2015 | Scalisi et al. | |
| 9,064,394 B1 * | 6/2015 | Trundle | G08B 13/19684 |
| 2008/0048870 A1 | 2/2008 | Laitta et al. | |
| 2008/0106422 A1 * | 5/2008 | Sparks | E04H 4/14 340/573.6 |
| 2009/0303055 A1 * | 12/2009 | Anderson | G08B 21/086 340/573.6 |
| 2012/0092163 A1 * | 4/2012 | Hart | G08B 15/02 340/541 |

(Continued)

*Primary Examiner* — Brian Wilson
(74) *Attorney, Agent, or Firm* — Fish & Richardson P.C.

(57) ABSTRACT

A monitoring system that is configured to monitor a includes a light device that is located at a pool of the property and that includes a camera that is configured to capture video data, and a monitoring control unit that is configured to receive, from the light device, the video data, determine that an object in the pool of the property is likely a person, based on determining that an object in the pool of the property is likely a person, determine a confidence score that reflects a likelihood that the person is swimming, determine that the confidence score does not satisfy a confidence score criteria, and perform a monitoring system action based on determining that the confidence score does not satisfy the confidence score criteria.

19 Claims, 4 Drawing Sheets

(56) References Cited

U.S. PATENT DOCUMENTS

| | | | |
|---|---|---|---|
| 2015/0092055 A1* | 4/2015 | Scalisi | G08B 21/088 |
| | | | 348/143 |
| 2018/0043210 A1* | 2/2018 | Niehaus | A63B 24/0006 |
| 2018/0089980 A1* | 3/2018 | Snyder | G06K 9/00771 |
| 2019/0034712 A1* | 1/2019 | Golan | G06K 9/00771 |
| 2019/0287378 A1* | 9/2019 | Rogers | G08B 31/00 |

* cited by examiner

UNDERWATER VIDEO MONITORING FOR SWIMMING POOL

CROSS REFERENCE TO RELATED APPLICATIONS

This application claims benefit of U.S. Provisional Application No. 62/554,226, filed Sep. 5, 2017, and titled "Underwater Video Monitoring for Swimming Pool," which is incorporated by reference in its entirety.

TECHNICAL FIELD

This disclosure relates to property monitoring technology and, for example, utilizing video analytics to monitor a swimming pool to identify pool maintenance and safety issues.

BACKGROUND

Many people equip homes and businesses with monitoring systems to provide increased security for their homes and businesses. These monitoring systems include several electronic components including sensors that may detect the presence of intruders.

SUMMARY

Techniques are described for monitoring technology. For example, techniques are described for integrating an in-home monitoring system with one or more electronic devices that monitor a swimming pool.

According to an innovative aspect of the subject matter described in this application, a monitoring system that is configured to monitor a property includes a light device that is located at a pool of the property and that includes a camera that is configured to capture video data, and a monitoring control unit that is configured to receive, from the light device, the video data, determine that an object in the pool of the property is likely a person, based on determining that an object in the pool of the property is likely a person, determine a confidence score that reflects a likelihood that the person is swimming, determine that the confidence score does not satisfy a confidence score criteria, and perform a monitoring system action based on determining that the confidence score does not satisfy the confidence score criteria.

These and other implementations each optionally include one or more of the following optional features. The monitoring control unit is configured to perform a monitoring system action by outputting an audible alarm. The monitoring control unit is configured to perform a monitoring system action by contacting emergency authorities. The monitoring control unit is configured to receive, from the light device, a second set of video data, determine that an object in the pool is likely a non-human object, compare a size of the object to a size threshold, based on determining that the size of the object satisfies the size threshold, communicate a notification to a user device of the resident of the property indicating that an object is in the pool.

The monitoring control unit is configured to determine a brightness level of the video data, compare the brightness level of the video data to a brightness level threshold, and based on determining that the brightness level of the video data does not satisfy the brightness level threshold, communicate a notification to the user device of the resident of the property indicating that maintenance of the pool is required.

The monitoring control unit is further configured to switch a LED light in the pool to light red. The monitoring control unit is configured to receive, from the light device, a second set of video data, determine that an object in the pool of the property is likely a person, based on determining that an object in the pool of the property is likely a person, determine a confidence score that reflects a likelihood that the person is swimming, determine that the confidence score satisfies a confidence score criteria, determine a number of laps the person swims, and communicate a notification to a user device of the resident of the property indicating the number of laps the person swims.

The monitoring control unit is configured to determine that an additional person is in the pool of the property, and communicate a notification to a user device of the resident of the property, indicating a number of persons in the pool. The monitoring control unit is configured to determine an armed status of the monitoring system, and based on determining that the monitoring system is armed away, receive data from one or more sensors and one or more cameras located throughout the monitored property, determine that the monitored property is unoccupied based on the data from the one or more sensors and one or more cameras, based on determining that the monitored property is unoccupied, increase a threshold of the confidence score criteria. The monitoring control unit is configured to determined an armed status of the monitoring system, and based on determining that the monitoring system is armed stay, receive data from one or more sensors and one or more cameras located throughout the monitored property, determine that the monitored property is occupied based on the data from the one or more sensors and one or more cameras, based on determining that the monitored property is occupied, decrease a threshold of the confidence score criteria.

The monitoring control unit is configured to receive, from the light device, a third set of video data, determine that an object in the pool of the property is likely a person, based on determining that the object in the pool of the property is likely a person, communicate a notification to a user device of a resident of the property that includes the video data, receive, from the user device of a resident, a response indicating that the person in the pool of the property is an unknown person, and based on receiving, from the user device of a resident, a response indicating that the person in the pool of the property is an unknown person, output a voice command instructing the person to vacate the pool.

The monitoring control unit is configured to analyze the video data using one or more algorithms based on one or more deep learning based models. The monitoring control unit is further configured to receive, from the light device, a second set of video data, determine that an object in the pool of the property is likely a person, determine a current time, based on determining that the current time is after a set time, communicate a notification to the user device of a resident of the property, a notification indicating that a person is in the pool. The monitoring control unit is configured to determine that an object in the pool of the property is likely a person by analyzing the video data to identify one or more limbs and identify a head. The monitoring control unit is configured to identify a surface of the pool as shown in the video data, and determine that the surface of the pool has been broken by an object, where determining that the object in the pool is likely a person is in response to determining that the surface of the pool has been broken by an object.

According to another innovative aspect of the subject matter described in this application, a computer-implemented method includes receiving, from the light device that is located at a pool of the property and that includes a camera, the video data, determining that an object in the pool of the property is likely a person, based on determining that an object in the pool of the property is likely a person, determining a confidence score that reflects a likelihood that the person is swimming, determining that the confidence score does not satisfy the confidence score criteria, and performing a monitoring system action based on determining that the confidence score does not satisfy the confidence score criteria.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for integrating one or more electronic devices into a monitoring system to allow for the monitoring of a swimming pool at a monitored property. The one or more electronic devices include one or more light/camera devices. Each of the one or more light/camera devices may include a wide angled camera and a light source, and may be configured to communicate wirelessly with a control unit of the monitoring system. The one or more light/camera devices may capture video data that is analyzed to detect the status of the pool. For example, the video data may be analyzed to detect a foreign object in the pool. Each of the one or more light/camera devices may be installed into a standard submerged pool light socket.

Figure 1:
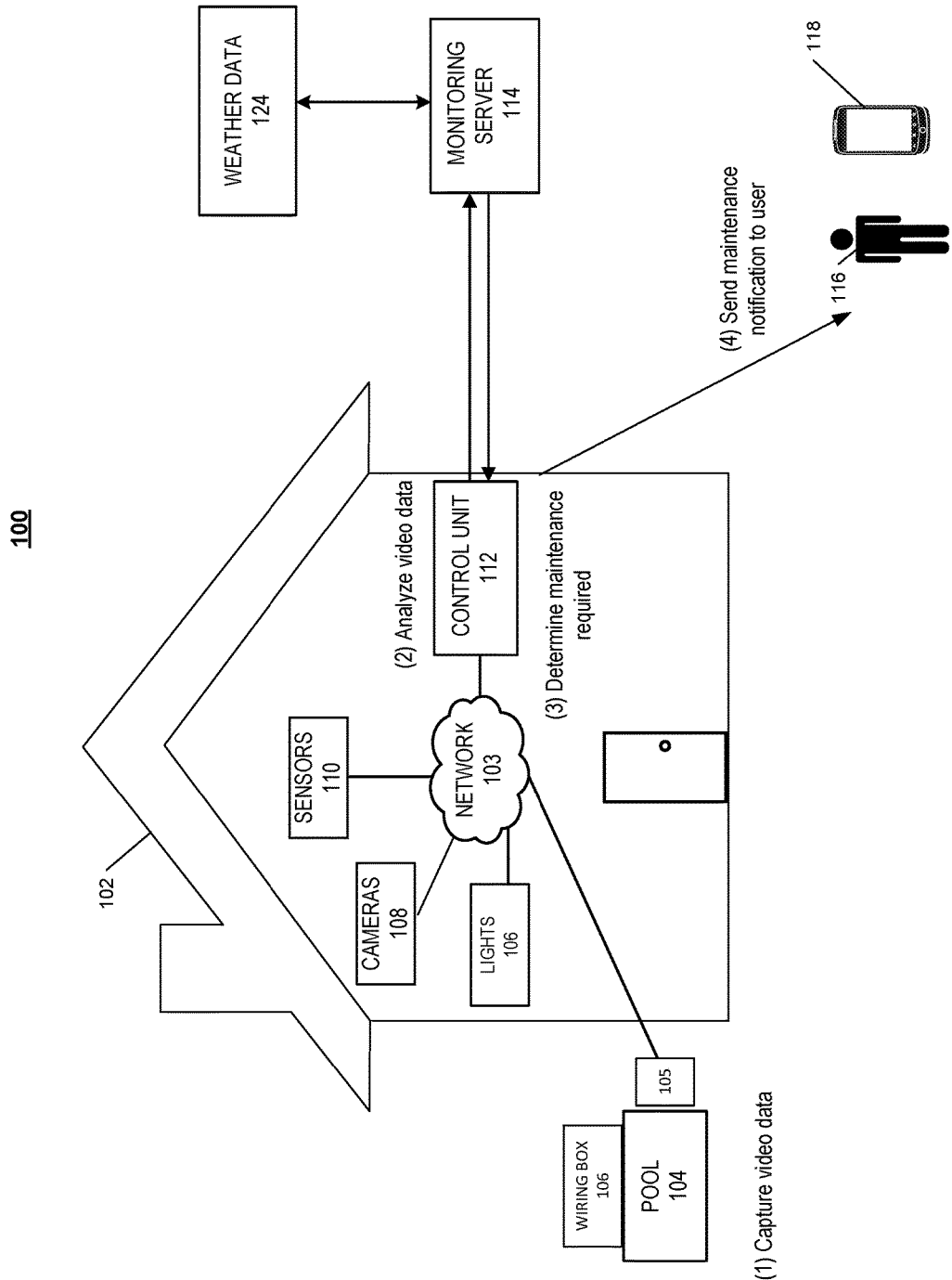
FIG. 1 illustrates an example of a system for monitoring a swimming pool at a monitored property.

FIG. 1 illustrates an example of a monitoring system 100 integrated with one or more light/camera devices 105. As shown in FIG. 1, a property 102 (e.g. a home) of a user 116 is monitored by an in-home monitoring system (e.g. in-home security system) that includes components that are fixed within the property 102. The in-home monitoring system may include a control unit 112, one or more sensors 110, one or more cameras 108, one or more lights 106, a wiring box 106, and one or more light/camera devices 105. The monitored property 102 may include a swimming pool 104 has one or more light/camera devices 105. The light/camera devices 105 may be in communication with the control unit 112 to form a part of the monitoring ecosystem of the monitored property 102. The user 116 may integrate the one or more light/camera devices 105 into the pool 104 to monitor the pool for status conditions. The pool 104 may be an indoor pool located within the monitored property 102, or an outdoor pool located on the lawn of the monitored property 102. In some examples, the user 116 may integrate a hot tub with a light/camera device. The one or more light/camera devices 105 may be used to monitor the pool 104 for foreign objects or for pool safety events. For example, the one or more light/camera devices 105 may monitor the pool 104 for a swimmer in distress.

Each of the light/camera devices 105 may be configured to screw into the standard submerged pool light socket. The user 116 may replace one or more standard pool lights with the one or more light/camera devices 105. In some examples, a light/camera device 105 may be installed in each of the one or more standard submerged pool light sockets. The form factor of the light/camera device 105 may be similar to the standard size of a submerged pool light. The light/camera device 105 may be connected to the network 103 through an Ethernet connection. The wiring box 106 may include a transformer that provides 12V power line to the pool lighting socket. The 12V power line may be augmented with an Ethernet cable that is connected to a wireless network module at the wiring box 106. The augmented power line provides the light/camera device 105 with network connectivity to the network 103 at the monitored property 102. In some implementations, the pool 104 may include an antenna that projects above the surface of the water in the pool 104. The antenna may provide wireless connectivity to the network 103. The antenna may be floating on the surface of the water or may be fixed to the side of the pool 104.

In some implementations, the light/camera device 105 may include an embedded Power Line Communication (PLC) chip. The embedded PLC chip may facilitate the exchange of data across the wiring that provides power to the light/camera device 105. The PLC network may include a node that is connected by an Ethernet cord to the control unit 112 or a router. When the PLC enabled light/camera device 105 is screwed into the pool light socket, the light/camera device 105 may automatically be connected to the network 103 by wired communication over the electrical power wiring. The connection between the PLC access point (node) and the PLC enabled light/camera device 105 may involve the use of the ground pin to allow crossing between phases in a home where the circuitry involves complex phases. The light/camera devices 105 may be configured with one of an Ethernet cable, a USB cable, or a PLC chip for network connectivity. In some implementations, the entire light fixture of the submerged pool light may be replaced with a new fixture. The submerged pool lights are removed and the wiring is updated to include an Ethernet augmented 12V power line. The light/camera device 105 is then connected to the augmented 12 V power line.

The light/camera device 105 may be powered by the power line to the pool light socket. In some examples, the light/camera device 105 may include a battery that can be used as a backup power supply. In other examples, a battery for backup power supply may be housed at the wiring box 106 adjacent to the pool 104. The wiring box 106 houses the 12V transformer that powers the electrical devices associated with the pool 104.

For the example illustrated in FIG. 1, the light/camera device 105 captures video data from the pool 104. The light/camera device 105 may be configured to continuously capture video data of the pool 104. In some examples, the light/camera device 105 is configured to initiate the capture of video data based on a user set timing schedule. For example, the user may set the light/camera device 105 to capture video data for a couple minutes on each hour. In the examples where the pool 104 has multiple light/camera devices 105, the user may have the ability to set the video data capture timing schedule for each of the multiple devices 105. In other examples, the light/camera device 105 is configured to capture video data when prompted by the control unit 112. The control unit 112 may prompt the light/camera devices 105 to capture video data when the control unit 112 detects a particular event at the monitored property 102. For example, the control unit 112 may prompt the light/camera device 105 to capture video data when the control unit 112 detects an alarm condition at the monitored property 102.

The pool 104 may be configured with one or more light/camera devices 105 to ensure that each square inch of the surface of the pool water is within the field of view of at least one light/camera device 105. The video data captured by the one or more light/camera devices 105 is communicated to the control unit 112. The control unit 112 communicates the video data to the monitoring server 114. The monitoring server 114 may be configured to interpret the video data to identify objects, actions, or other events that the user classifies as an alert event. For example, the control unit 112 may be trained to identify the action of a swimmer in distress. The monitoring server 114 may be trained to identify the action of a swimmer swimming laps in the pool 104. In some implementations, the control unit 112 performs the video analytics on the video data. The monitoring server 114 may be a server that is located remotely from the monitored property 102, and may be in communication with one or more control units from one or more properties that are monitored by an in-home monitoring system. The monitoring server 114 may receive data from a weather data server 124.

The monitoring server 114 may implement the use of one or more algorithms and deep learning based models to make determinations of actions from the collected video data. The monitoring server 114 may utilize training sets of data to improve the algorithms used to detect actions from the video data received from the control unit 112. The monitoring server 114 may be trained by the user 116 to detect the actions identified by the user 116 as alert event. The user 116 may set the system to a training mode and provide confirmation of an action. For example, while the system is in training mode the user may provide true or false responses based on reviewing video data of different actions. The user 116 may review the video data and the determination made by the monitoring server 114 to respond whether the determination was true or false. Receiving user feedback while in training mode helps the monitoring server to improve the algorithms used to make the determinations. In some implementations, the system may receive user feedback in the typical operation mode. In some implementations, the monitoring server 114 may receive aggregated training data from multiple light/camera devices 105 from multiple different monitored properties. The deep learning based models and the one or more algorithms may be updated by the aggregated training data on a continuous basis. In some examples, the system may be trained prior to the deployment of the pool monitoring system at the monitored property 102. In these examples, the monitoring server 114 may communicate aggregated training data to the control unit 112 of the monitoring system prior to the initiation of the pool monitoring feature of the monitoring system.

When the system is in training mode, the system may learn the appearance of the surface of the pool 104 during different times of the day, and during different weather events. For example, the system may learn the appearance of the surface of the pool 104 during cloudy weather conditions. The system may also learn the appearance of the surface of the pool 104 based on different lighting conditions. For example, the system may learn the appearance of the surface of the pool 104 when one pool light is on, and may learn the appearance of the surface of the pool 104 when all of the lights are on and one or more lights around the pool 104 are on. The system may be configured to determine the appearance of the sides of the pool 104 and the floor of the pool 104, and to learn the geometry of the pool 104. In some implementations, the system is trained to identify the level of water in the pool 104. The system may also be configured to learn how light and shadows from nearby structures move and affect the appearance of the surface of the pool 104. The system may learn the geometry of the pool 104 and the appearance of the water's surface. Based on learning the appearance of the water's surface, the system is configured to ignore the activity above the water surface and differentiate objects which break the surface and enter the pool 104. The user 116 may log into a monitoring application that runs on the user device 118 to set the one or more events that should be considered an alert event, and may also set the appropriate action that should be taken in response to the set action. For example, the user 116 may set detecting a swimmer in distress as an alert event, and may set the action to be taken as sounding an audible alarm to alert other occupants of the property. In this example, the control unit 112 may also communicate the data to the monitoring server 114, which may notify the relevant authorities of the swimmer's distress. For example, the monitoring server 114 may communicate the data to a central station server. The user 116 may continuously personalize the list of actions by adding or removing actions from the set preferences through the monitoring application on the user device 118. The user 116 may configure the system to identify when someone enters the pool, to count the laps of a swimmer, to identify foreign objects in the pool 104, to identify when maintenance is required, and to identify any other appropriate action. For example, the system may be configured to identify and count the number of persons in the pool 104.

For the example illustrated in FIG. 1, the user 116 sets an action for determining that maintenance is required. In some implementations, the one or more light/camera devices 105 perform the video analytics on the captured video data, in other implementations, the video data is communicated to the control unit 112 and in turn communicated to the monitoring server 114. The video data may be analyzed based on several different criteria, including determining the appearance of the geometry of the pool 104, determining the intensity of light, and determining the visibility of the water. Based on the control unit 112 analyzing the received video data and the received weather data, the control unit 112 determines that the pool water is cloudy, and maintenance is required. The control unit 112 may determine the pool water is cloudy when the brightness level of the received video data is below a threshold value. The threshold value may be a user set value. The control unit 112 may determine that maintenance is required based on the appearance of the pool floor or the sides of the pool 112. For example, the control unit 112 may determine that pool maintenance is required when the pool floor has debris.

The control unit 112 sends a maintenance notification to the mobile device 118 of the user 116. The notification is sent to the user 116 based on the user's preferences. The notification may be communicated as an in-application notification, or may be communicated as an SMS text message. In some examples, the user 116 may configure his settings to switch an LED light in the pool 104 to light red. The red LED light indicates to the user 116 that maintenance is required. The pool 104 may be fixed with one or more LED lights that may be used to control the color and brightness of the pool 104. The user 116 may adjust the color and brightness of the one or more LEDs. The user 116 may set the one or more LED to adjust based on a user set schedule. In some implementations, the color and the brightness of the one or more LEDs may be controlled by the control unit 112 based on the lighting requirements required for the light/camera devices 105 to acquire viable video data. For example, the control unit 112 may switch on one or more LEDs when poor contrast is detected.

In some implementations, when the in-home monitoring system is armed away, the control unit 112 assumes that the occupants of the monitored property are away. The control unit 112 may confirm whether the property 102 is unoccupied by using one or more electronic devices and sensors located throughout the property 102. For example, the control unit 112 may switch on one or more cameras to scan the one or more rooms of the property 102 to ensure the property 102 is unoccupied. When the control unit 112 confirms that the property is unoccupied, and determines that a human object is in the pool 104, the control unit 112 generates an alarm. For example, the control unit 112 may sound an audible alarm. In other examples, the control unit 112 may prompt a speaker near the pool to out a voice command instructing the person(s) in the pool to vacate the pool 104. The control unit 112 may send a notification to the user 116 indicating that a person has been detected in the pool 104. In some implementations, the control unit 112 may prompt an exterior camera near the pool deck to capture image data of the persons in the pool 104. In these implementations, the control unit 112 may communicate the captured image data to the user 116. The user 116 may review the image data to determine whether the persons(s) in the pool 104 are known person(s). For example, the user 116 may determine the persons in the pool 104 are the neighbors' kids. The user 116 may communicate a response to the control unit 112 indicating that the authorities should not be contacted based on determining the persons in the pool 104 are known persons. In other implementations, the user 116 may determine the person(s) in the pool 104 are unknown person(s). The user 116 may communicate a response to the control unit 112 indicating that the authorities should be contacted based on determining the person(s) in the pool 104 are unknown person(s). The control unit 112 may communicate the captured image data to the monitoring server 114 which in turn communicates the image data to the appropriate authorities.

In some implementations, the system may be configured to generate an alarm when the control unit 112 detects that persons are in the pool 104 after a set time. For example, the user may configure the system to generate an alarm when persons are detected in the pool between 11:00 PM to 6:00 AM. When the in-home monitoring system is disarmed, the control unit 112 assumes the property is occupied, and commands the one or more light/camera devices 105 to continuously capture video data to monitor the pool 104. When a person is detected in the pool 104 when the system is disarmed, one or more cameras near the pool 104 may capture images of the person in the pool 104. The control unit 112 may compare the one or more captured images to stored images of the occupants of the property. Based on determining that the person in the pool 104 is an underage occupant of the property 102, communicating an alert to the user 116. In some examples, when the control unit 112 determines that an underage occupant is the only occupant in the pool 104, the control unit 112 generates an audible output requesting the occupant vacate the pool 104.

Figure 2:
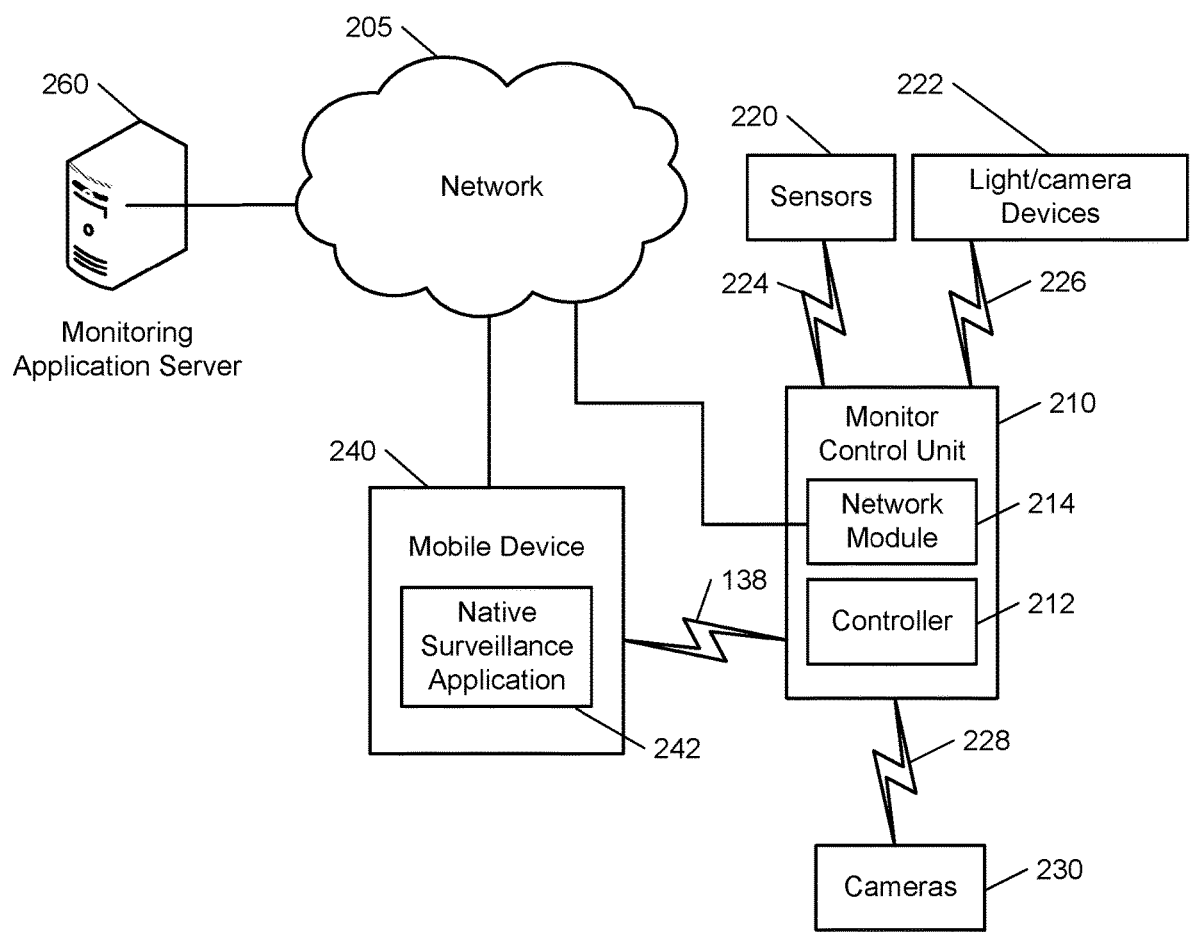
FIG. 2 illustrates an example of a monitoring system integrated with one or more light/camera devices.

FIG. 2 illustrates an example of a system 200 configured to monitor a property. The system 200 includes a network 205, a monitoring system control unit 210, one or more user devices 240, a monitoring application server 260, and a central alarm station server 270. The network 205 facilitates communications between the monitoring system control unit 210, the one or more user devices 240, the monitoring application server 260, and the central alarm station server 270. The network 205 is configured to enable exchange of electronic communications between devices connected to the network 205. For example, the network 205 may be configured to enable exchange of electronic communications between the monitoring system control unit 210, the one or more user devices 240, the monitoring application server 260, and the central alarm station server 270. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from indoor door knobs, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include one or more light/camera devices 222. Each of the light/camera devices 222 may be in communication with the monitor control unit 210. In some implementations, the light/camera device 222 may communicate with the monitor control unit 210 through Zwave, Zigbee, BLE, LoRA, LPWan, GSM, CDMA, LTE, Wi-Fi, Powerline, PoE, Ethernet, other wireline, proprietary 900 Mhz/2.4 Gz/other radio frequency, or any other suitable method of communication.

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The one or more cameras 230 may be triggered by several different types of techniques. For instance, a Passive Infra Red (PIR) motion sensor may be built into the one or more cameras 230 and used to trigger the one or more cameras 230 to capture one or more images when motion is detected. The one or more cameras 230 also may include a microwave motion sensor built into the camera and used to trigger the camera to capture one or more images when motion is detected. Each of the one or more cameras 230 may have a "normally open" or "normally closed" digital input that can trigger capture of one or more images when external sensors (e.g., the sensors 220, PIR, door/window, etc.) detect motion or other events. In some implementations, at least one camera 230 receives a command to capture an image when external devices detect motion or another potential alarm event. The camera may receive the command from the controller 212 or directly from one of the sensors 220.

In some examples, the one or more cameras 230 triggers integrated or external illuminators (e.g., Infra Red, Z-wave controlled "white" lights, lights controlled by the module 214, etc.) to improve image quality when the scene is dark. An integrated or separate light sensor may be used to determine if illumination is desired and may result in increased image quality.

The sensors 220, the light/camera devices 222, and the cameras 230 communicate with the controller 212 over communication links 224, 226, and 228. The communication links 224, 226, and 228 may be a wired or wireless data pathway configured to transmit signals from the sensors 220, the light/camera devices 222, and the cameras 230 to the controller 212. The communication link 224, 226, and 228 228 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CATS) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 140 to receive and process image and sensor data from the monitoring system.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bolt, Lora, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
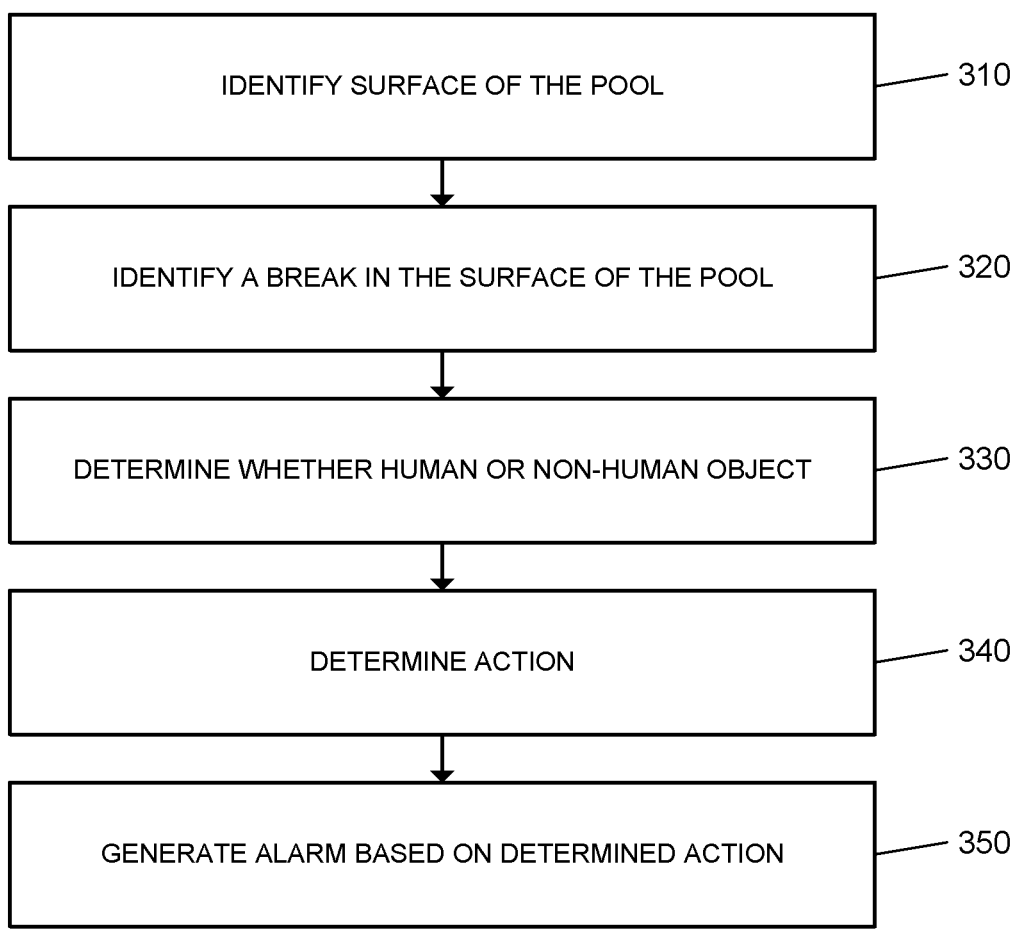
FIG. 3 is a flow chart of an example process for generating an alarm based on a determined action.

FIG. 3 illustrates an example process 300 for generating an alarm based on a determined action. The control unit 112 identifies the surface of the pool 104 (310). The one or more light/cameras 105 capture video data and communicates the data to the control unit 112. The control unit 112 is configured to identify the surface of the pool 104 by utilizing trained data. In some implementations, the control unit 112 communicates the captured video data to the monitoring server 114, and the monitoring server performs the video analytics on the received data. In some other implementations, the one or more light/camera devices 105 perform the video analytics on the captured video data.

Each of the one or more light/camera devices 105 may be installed into a submerged pool light socket. The one or more light/camera devices 105 may be configured so that the field of view of at least one light/camera device 105 captures each square inch of the surface of the pool 104. During the initial set up of the pool monitoring system, the one or more light/camera devices 105 are configured to learn the dimensions of the pool 104. The system may be configured to determine the water surface, and to ignore the activity above the surface of the water. The one or more light/camera devices 105 capture video data to determine the appearance of the pool surfaces under different lighting conditions. For example, the one or more light/camera devices 105 capture video data of the pool 104 during the night and during the day. The one or more light/camera devices 105 may determine what the appearance of the pool 104 during different weather conditions. For example, the one or more light/camera devices 105 capture video of the pool 104 during windy conditions, rainy conditions, and cloudy conditions. In some implementations, during the initial set up, the one or more light/camera devices 105 may capture video data of the surfaces of the pool 104 when the pool 104 is not filled with water.

When the system is in training mode, the control unit 112 may receive trained data sets that teach the system the appearance of the surfaces of pool 104 under different conditions. The user 116 may also provide confirmation of the system determinations when in training mode. The user 116 may provide true or false responses based on reviewing video data of different actions in the captured video data. The user 116 may review the video data and the determinations made by the control unit 112 to respond whether each of the determinations was true or false. For example, the system may determine a person is swimming in the pool 104, and the user may confirm whether the person was swimming or was in distress.

The control unit 112 identifies a break in the surface of the pool 104 (320). The control unit 112 may analyze the received video data to determine when there is a change in the surface of the pool 104. The control unit 112 may be configured to recognize the changes in the light refracted off the surface of the pool 104 when the surface of the pool is broken. The control unit 112 may use one or more different techniques to determine that the surface of the pool 104 is broken.

The control unit 112 determines whether the break in the surface of the pool 104 was caused by a human or a non-human object (330). The control unit 112 is trained to identify the characteristics of a human, such as the face and the limbs to determine whether the object is human or not. For example, the control unit 112 determines that the object has limbs similar to a human and determines that the object is human. In some implementations, each of the one or more light/camera devices 105 may include a Passive Infrared Sensor (PIR) that is configured to detect heat radiated from living objects. When a light/camera device 105 detects heat off the object that broke the surface of the pool 104, the control unit 112 determines that the object is a human.

Based on the control unit 112 determining that the object is a human object, the control unit 112 determines the action of the object (340). The control unit 112 analyzes the captured video data to determine whether the human is swimming, standing, or is in distress. The control unit 112 may be trained to identify the strokes of the human. The control unit 112 may determine whether the human is in relatively stagnant position, or whether the human is moving through the water. The control unit 112 may determine that the human is in distress when it is determined that the human is moving towards the bottom surface of the pool 104.

The control unit 112 generates an alarm based on determining that the human is in distress (350). The control unit 112 may sound an audible alarm within the monitored property 102 to notify the one or more residents of the distressed swimmer. In these implementations, the one or more light/camera devices 105 may light red to indicate an alarm situation in the pool 104. The control unit 112 may communicate the alarm data to the monitoring server 114, which in turn communicates the data to the relevant authorities.

Figure 4:
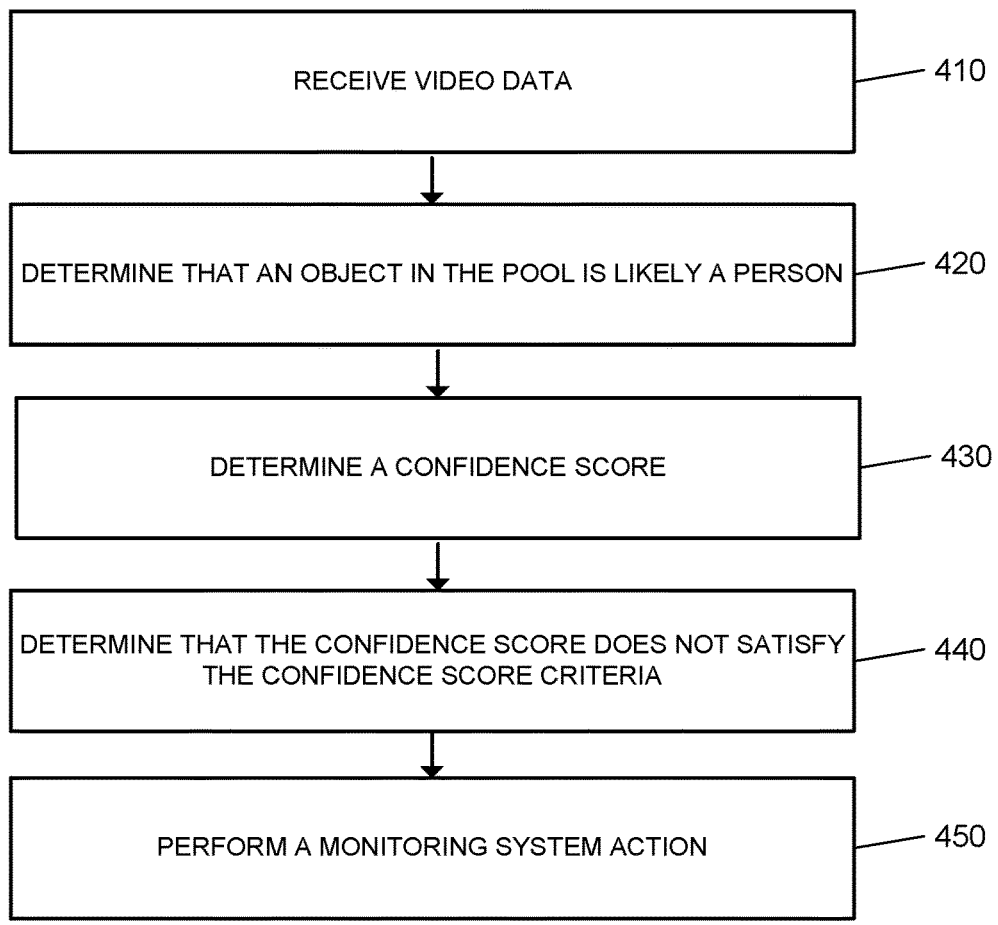
FIG. 4 is a flow chart of example process for performing a monitoring system action.

FIG. 4 illustrates an example process 400 for performing a monitoring system action. The process 400 may be performed by a monitoring system at a monitored property that includes one or more light devices that are located at a pool of the property, and that each include a camera that is configured to capture video data. The process 400 includes the monitoring control unit receiving video data from the light/camera device (410). For example, the monitoring control unit 112 may receive video data from a light/camera device 105 based on a user set timing schedule. The resident of the property 102 may set a timing schedule for each of the one or more light/camera devices 105 located at the pool 104. The resident may set the timing schedule for each of the light/camera devices 105 to initiate capture of video data every two minutes. In some examples, the one or more light/camera devices 105 may be configured to continuously capture video data of the pool 104. In these examples, the monitoring control unit 112 receives video data from the one or more light/camera devices 105 continuously. In other examples, the monitoring control unit 112 receives video data from the one or more light/camera devices 105 when the monitoring control unit 112 prompts the one or more light/camera devices 105 to capture video data. For example, the monitoring control unit 112 may prompt the 1 or more light/camera devices 105 to capture video data when the monitoring control unit 112 detects an alarm condition at the monitored property 102.

The one or more light/camera devices 105 each have a form factor that is similar to a standard size of a submerged pool light. The resident of the monitored property 102 may replace each of the one or more standard pool lights of the pool 104 with a light/camera device 105. In some examples, a subset of the one or more standard pool lights may each be replaced with a light/camera device 105.

The process 400 includes determining that an object in the pool is likely a person (420). For example, the monitoring control unit 112 determines that the object in the pool 104 has limbs similar to a human and determines the object is human. The monitoring control unit 112 utilizes one or more video analytics techniques to analyze the received video data. The monitoring control unit 112 may implement the use of one or more algorithms and deep learning based models to make determinations of actions from the video data. The monitoring control unit 112 may be configured to identify the surface of the pool 104 utilizing trained data. Based on recognizing the changes in the light refracted off the surface of the pool 104 when the surface of the pool 104 is broken, the monitoring control unit 112 may be configured to identify when there is a break in the surface of the pool 104.

In some examples, the one or more light/camera devices 105 each include a Passive Infrared Sensor (PIR sensor) that detects the heat that radiates from a living object. The PIR sensor detects the heat radiated off the object and communicates the sensor data to the monitoring control unit 112. The monitoring control unit 112 may use the PIR sensor data and the analyzed video data to determine that the object in the pool is likely a person. In some examples, the monitoring control unit 112 is configured to determine an object with four limbs and a head is a human object.

The process 400 may include receiving additional video. For example, the one or more light/camera devices 105 continuously capture video data of the object, and communicate the additional video data to the monitoring control unit 112. The process 400 includes determining a confidence score that reflects a likelihood that the person is swimming (430). For example, the monitoring control unit 112 determines that the person is swimming with a confidence score of 60%. The monitoring control unit 112 may be configured to analyze video to determine whether a person is swimming or in distress. The monitoring control unit 112 may be configured to identify the strokes of the person, or whether the person is moving towards the bottom of the pool 104. The monitoring control unit 112 determines a confidence score that reflects the likelihood that the person is swimming based on the one or more determinations of the person's actions. In some examples, the confidence score is algorithmically determined by the monitoring control unit 112.

The process 400 involves determining that the confidence score does not satisfy the confidence score criteria (440). For example, the monitoring control unit 112 determines that the confidence score of 30% does not meet the confidence score criteria. The monitoring control unit 112 may be configured to compare the confidence score to a confidence score criteria. In one example, the confidence score criteria may be that the confidence score is greater than a threshold. In another example, the confidence criteria may be that the confidence score is greater than or equal to a threshold. The monitoring control unit 112 determines that the person is likely in distress based on the confidence score not satisfying the confidence score criteria.

In some implementations, the monitoring control unit 112 may compare the confidence score to one or more confidence score criteria. For example, the monitoring control unit 112 may compare the confidence score to a high confidence score criteria and to a low confidence score criteria. For example, the high confidence score criteria may be 80% threshold and the low confidence score criteria may be 40% threshold. The monitoring control unit 112 may determine that the person is in distress when the confidence score does not satisfy the low confidence score criteria, and the monitoring control unit 112 may determine that the person is swimming when the confidence score satisfies the high confidence score criteria. In these implementations, when the confidence score is between 40% and 80%, the monitoring control unit 112 may require user feedback to determine whether the person is playing, standing, or floating in the pool 104. For example, the monitoring control unit 112 may communicate the video data of the person to a user device of the resident. Based on the data received from the resident, the monitoring control unit 112 may confirm the person's actions.

The process 400 involves performing a monitoring system action (450). For example, when the monitoring control unit 112 determines that the person is in distress, the monitoring control unit 112 may generate an audible alarm throughout the monitored property 102. In another example, when the monitoring control unit 112 determines that the person is in distress, the monitoring control unit 112 may communicate with an external server to contact the relevant authorities. For example, the monitoring control unit 112 may communicate with a server of emergency responders to dispatch paramedics.

In some implementations, where the monitoring control unit 112 determines that the object in the pool is a non-human object, the monitoring control unit 112 may use one or more different techniques to compare the apparent size of the object to a size threshold. When the monitoring control unit 112 determines that the object in the pool 104 satisfies the size threshold, the monitoring control unit 112 may communicate a notification to the user device of the resident of the property 102. The notification may indicate that a large object is in the pool 104. For example, when a tree branch falls into the pool 104, the monitoring control unit 112 determines the tree branch is bigger than the size threshold, and sends a notification to the user device of the resident of the property. In some examples, the notification may include one or more images of the object from the video data. When the object in the pool 104 does not satisfy the size threshold, the monitoring control unit 112 does not communicate a notification. For example, when a stone falls into the pool 104.

In some implementations, the monitoring control unit 112 determines a brightness level of the video data received from the one or more light/camera devices 105. The monitoring control unit 112 compares the brightness level of the video data to a brightness level threshold. Based on determining that the brightness level of the video data does not satisfy the brightness level threshold, monitoring control unit 112 determines that the pool water is cloudy or murky. In these implementations, the monitoring control unit 112 may receive weather data from an external weather data server. The weather data server provides current weather data for the location of the monitored property 102. The monitoring control unit 112 may change the brightness level threshold based on the current weather conditions. For example, the monitoring control unit 112 may decrease the brightness level threshold when the current weather conditions are cloudy. The monitoring control unit 112 communicates a notification to the user device of the resident of the property 102 indicating that maintenance of the pool 104 is required. In some examples, the monitoring control unit 112 is configured to light an LED in the pool 104 red. The red LED light indicates to the resident of the property 102 that the pool 104 is in need of maintenance. In some examples, the LED light in the pool 104 may be configured to light one or more colors to indicate one or more different pool conditions to the resident of the property 102. For example, the monitoring control unit 112 may be configured to light the LED in the pool green when no one is swimming in the pool 104. For another example, the monitoring control unit 112 may be configured light a different color based on the number of laps a person has swam. In other implementations, the monitoring control unit 112 may be configured to receive sensor data from one or more light sensors and one or more cameras that are located in the vicinity of the pool 104 to determine a baseline for the current weather conditions at the property 102. For example, the monitoring control unit 112 may receive video data from a back door camera that has the pool 104 in its field of view, the video data may be used to confirm the current weather conditions at the property 102. In some implementations, the monitoring control unit 112 may receive video data from a camera above the surface of the water of the pool 104. The monitoring control unit 112 may use the video data received from the camera above the surface of the water of the pool 104 to correlate to the video data received from the light/camera devices 105. For example, the video data from the camera above the surface of the pool water may be used by the monitoring control unit 1112 during the configuration of the system to learn a transformation between the video received from the camera above the surface of the pool water, and the video data received from the light/camera devices 105. The monitoring control unit 112 may continuously compare the video data received from the camera above the surface of the pool water to the video data received from the light/camera devices 105. The monitoring control unit 112 may be configured to detect a disturbance in the water's surface based on comparing the video data received from the camera above the surface of the pool water to the video data received from the light/camera devices 105. In some implementations, when the monitoring control unit 112 determines that the confidence score that reflects the likelihood that the person is swimming satisfies the confidence score criteria, the monitoring control unit 112 may be configured to determine a number of laps that the person in the pool 104 swims. In these implementations, the monitoring control unit 112 may communicate a notification to the resident of the property 102 indicating the number of laps. The monitoring control unit 112 may be configured to count the number of person in the pool 104. In these implementations, the monitoring control unit 112 may communicate a notification to the user device of the resident of the property 102 indicating the number of persons in the pool 104.

In some implementations, the monitoring control unit 112 may communicate one or more images of the one or more persons in the pool 104 to the user device of the resident of the property 102. The resident 102 may indicate that a person in the pool is an unknown person and prompt the monitoring control unit 112 to perform a monitoring action. For example, the resident may indicate that the person is in the pool 104 is unknown, and prompt the monitoring control unit 112 to sound an audible alarm. In another example, the resident may command the monitoring control unit 112 to output, from a speaker near the pool 104, a voice command instructing the persons to vacate the property 102.

In some implementations, the resident of the property 102 may configure the monitoring control unit 112 to generate an alarm when a person is detected in the pool during a set time. For example, the resident may wish to receive a notification when a person is in the pool after 10:00 PM on a weekday. In these implementations, when the monitoring control unit 112 determines that a person is in the pool 104, the monitoring control unit 112 compares the current time to the user set time. Based on determining that the current time is past the set time period, the monitoring control unit 112 communicates a notification to the user device of the resident.

In some implementations, the monitoring control unit 112 is configured to identify a surface of the pool as shown in the received video data. The monitoring control unit 112 then determines that the surface of the pool has been broken by an object. The monitoring control unit 112 is configured to determining that the object in the pool is likely a person in response to determining that the surface of the pool had been broken by an object.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
 a light device that is located at a pool of the property and that includes a camera that is configured to capture video data; and
 a monitoring control unit that is configured to:
  determine an armed status of the property;
  based on the armed status of the property, receive data from one or more sensors and one or more cameras located throughout the property;
  based on the armed status of the property and the data from the one or more sensors and one or more cameras, determine an occupancy status of the property;
  based on determining the occupancy status of the property, adjust a threshold of a confidence score criteria;
  receive, from the light device, the video data;
  determine that an object in the pool of the property is likely a person;
  based on determining that an object in the pool of the property is likely a person, determine a confidence score that reflects a likelihood that the person is swimming;
  determine that the confidence score does not satisfy the adjusted threshold of the confidence score criteria; and
  perform a monitoring system action based on determining that the confidence score does not satisfy the adjusted threshold of the confidence score criteria.

2. The monitoring system of claim 1, wherein the monitoring control unit is configured to perform the monitoring system action by outputting an audible alarm.

3. The monitoring system of claim 1, wherein the monitoring control unit is configured to perform the monitoring system action by contacting emergency authorities.

4. The monitoring system of claim 1, wherein the monitoring control unit is configured to:
 receive, from the light device, a second set of video data;
 determine that an object in the pool is likely a non-human object;
 compare a size of the object to a size threshold; and
 based on determining that the size of the object satisfies the size threshold, communicate a notification to a user device of a resident of the property indicating that an object is in the pool.

5. The monitoring system of claim 1, wherein the monitoring control unit is configured to:
 determine a brightness level of the video data;
 compare the brightness level of the video data to a brightness level threshold; and
 based on determining that the brightness level of the video data does not satisfy the brightness level threshold, communicate a notification to a user device of a resident of the property indicating that maintenance of the pool is required.

6. The monitoring system of claim 5, wherein the monitoring control unit is further configured to switch a LED light in the pool to light red.

7. The monitoring system of claim 1, wherein the monitoring control unit is configured to:
 receive, from the light device, a second set of video data;
 determine that an object in the pool of the property is likely a person;
 based on determining that an object in the pool of the property is likely a person, determine a confidence score that reflects a likelihood that the person is swimming;
 determine that the confidence score satisfies a confidence score criteria;
 determine a number of laps the person swims; and
 communicate a notification to a user device of a resident of the property indicating the number of laps the person swims.

8. The monitoring system of claim 7, wherein the monitoring control unit is configured to:
 determine that an additional person is in the pool of the property; and
 communicate a notification to the user device of the resident of the property, indicating a number of persons in the pool.

9. The monitoring system of claim 1, wherein the monitoring control unit is configured to analyze the video data using one or more algorithms based on one or more deep learning based models.

10. The monitoring system of claim 1, wherein the monitoring control unit is further configured to:
 receive, from the light device, a second set of video data;
 determine that an object in the pool of the property is likely a person;
 determine a current time; and
 based on determining that the current time is after a set time, communicate a notification to a user device of a resident of the property, a notification indicating that a person is in the pool.

11. The monitoring system of claim 1, wherein the monitoring control unit is configured to determine that an object in the pool of the property is likely a person by analyzing the video data to identify one or more limbs and identify a head.

12. The monitoring system of claim 1, wherein the monitoring control unit is configured to:
 identify a surface of the pool as shown in the video data; and
 determine that the surface of the pool has been broken by an object,
 wherein determining that the object in the pool is likely a person is in response to determining that the surface of the pool has been broken by an object.

13. A monitoring system that is configured to monitor a property, the monitoring system comprising:
 a light device that is located at a pool of the property and that includes a camera that is configured to capture video data; and
 a monitoring control unit that is configured to:
  determine an armed status of the monitoring system;
  based on determining that the monitoring system is armed away, receive data from one or more sensors and one or more cameras located throughout the property;
  determine that the property is unoccupied based on the data from the one or more sensors and one or more cameras;

based on determining that the property is unoccupied, increase a threshold of a confidence score criteria;
receive, from the light device, the video data;
determine that an object in the pool of the property is likely a person;
based on determining that an object in the pool of the property is likely a person, determine a confidence score that reflects a likelihood that the person is swimming;
determine that the confidence score does not satisfy the increased threshold of the confidence score criteria; and
perform a monitoring system action based on determining that the confidence score does not satisfy the increased threshold of the confidence score criteria.

14. The monitoring system of claim 13, wherein the monitoring control unit is configured to:
based on determining that the object in the pool of the property is likely a person,
communicate a notification to a user device of a resident of the property that includes the video data;
receive, from the user device of the resident, a response indicating that the person in the pool of the property is an unknown person; and
based on receiving, from the user device of the resident, a response indicating that the person in the pool of the property is an unknown person, output a voice command instructing the person to vacate the pool.

15. A computer-implemented method comprising:
determining an armed status of a property;
based on the armed status of the property, receiving data from one or more sensors and one or more cameras located throughout the property;
based on the armed status of the property and the data from the one or more sensors and one or more cameras, determine an occupancy status of the property;
based on determining the occupancy status of the property, adjusting a threshold of a confidence score criteria;
receiving, from a light device that is located at a pool of the property and that includes a camera, video data;
determining that an object in the pool of the property is likely a person;
based on determining that an object in the pool of the property is likely a person, determining a confidence score that reflects a likelihood that the person is swimming;
determining that the confidence score does not satisfy the adjusted threshold of the confidence score criteria; and
performing a monitoring system action based on determining that the confidence score does not satisfy the adjusted threshold of the confidence score criteria.

16. The method of claim 15, wherein performing a monitoring system action based on determining that the confidence score does not satisfy the adjusted threshold of the confidence score criteria comprises outputting an audible alarm.

17. The method of claim 15, wherein performing a monitoring system action based on determining that the confidence score does not satisfy the adjusted threshold of the confidence score criteria comprises contacting emergency authorities.

18. The method of claim 15, further comprising:
receiving, from the light device, a second set of video data;
determining that an object in the pool is likely a non-human object;
comparing a size of the object to a size threshold; and
based on determining that the size of the object satisfies the size threshold, communicating a notification to a user device of a resident of the property indicating that an object is in the pool.

19. The method of claim 15, comprising:
identifying a surface of the pool as shown in the video data; and
determining that the surface of the pool has been broken by an object,
wherein determining that the object in the pool is likely a person is in response to determining that the surface of the pool has been broken by an object.

* * * * *